United States Patent Office 3,493,343
Patented Feb. 3, 1970

3,493,343
PRODUCTION OF HYDROGEN PEROXIDE
William R. Logan, Dunstable, and John E. Braid, Luton, England, assignors to Laporte Chemicals Limited
No Drawing. Filed Nov. 22, 1966, Ser. No. 596,094
Claims priority, application Great Britain, Nov. 25, 1965, 50,184/65
Int. Cl. C01b *15/02*
U.S. Cl. 23—207                          28 Claims

ABSTRACT OF THE DISCLOSURE

This invention is directed to catalyst material suitable for use in hydrogenation reactions and which is made up of a macroreticular ion exchange resin having a surface area of at least 5 m.$^2$/g. as a support which carries upon it a deposit of a metal such as ruthenium, rhodium, palladium, osmium, iridium and platinum or a combination of any of these metals. The invention also includes the use of this hydrogenation catalyst in the production of hydrogen peroxide by a process of alternate hydrogenation and oxidation of a reducible quinone which is later oxidized to form the peroxide. The preferred range of surface area of the ion exchange resin is from 20 to 80 m.$^2$/g.

---

This invention relates to the production of hydrogen peroxide, more especially to the production of hydrogen peroxide by a cyclic process involving alternate hydrogenation and oxidation of a reducible/oxidisable organic compound, and further relates to novel catalysts suitable for use as hydrogenation catalysts in such a cyclic process.

Certain "platinum group" metals, have previously been proposed as hydrogenation catalysts for example for use in the hydrogenation step of a cyclic process for the producction of hydrogen peroxide involving alternate hydrogenation and oxidation of reducible/oxidisable organic compounds. The majority of such catalysts are of the metal deposit on carrier type, and in the great majority of cases palladium is the metal chosen and the variation has been in the carrier employed. Among materials proposed hitherto as carriers, are activated alumina, activated magnesia, artificial aluminosilicates, titanium dioxide and cementitious materials. By the term "platinum group" is meant ruthenium, rhodium, palladium, osmium, iridium and platinum.

The present invention provides a catalyst material suitable for use in hydrogenation reactions, which catalyst essentially comprises a macroreticular ion exchange resin having a surface area of at least 5 m.$^2$/g. carrying a deposit of one or more metals of the platinum group. Platinum, rhodium and palladium are the preferred metals for catalysts in accordance with the invention.

Desirably the surface area of the ion-exchange resin is at least 20 m.$^2$/g., advantageously from 20 to 80 m.$^2$/g. Preferably the ion-exchange resin is of particle size not larger than 40 mesh B.S.S., suitably from 40 to 350 mesh B.S.S. desirably 50 to 200 mesh and advantageously from 100 to 150 mesh. Resin supports having such surface areas and particle sizes are especially preferred for hydrogenation catalysts which are to be employed in a cyclic process for the production of hydrogen peroxide.

The method of preparing the catalyst material depends upon which of the metals of the platinum group is required and further depends upon whether the macroreticular ion-exchange resin is in the cation or the anion form. As is well-known, cation and anion exchange resins each take either a "strong" form or a "weak" form according to the functional group of the resin. The description herein relates to both strong and weak form unless one or the other is specially mentioned. When, hereafter the form of an ion exchange resin is identified by reference to a functional group it is not intended to imply that all of the exchange sites on the resin are occupied by the group but only that the functional group named is the predominant one present. The present invention also provides process for the production of the novel catalysts comprising contacting the ion exchange resin with a solution containing ions of the metal or metals to be deposited thereon, removing the ion exchange resin containing absorbed metal ions from the bulk of the solution and reducing the absorbed ions to be corresponding metal. In the case of palladium deposition on a cation exchange resin the latter is contacted with, for example, a palladium nitrate/nitric acid solution. The quantity of nitric acid is preferably no greater than the quantity required to prevent hydrolysis during the preparation. In this way competition by H$^+$ ions for ion exchange sites is kept to a minimum. Instead of the nitrate/nitric acid solution any other suitable composition may be employed, for example the sulphate/sulphuric acid counterpart. For palladium-deposition on to the anion exchange resin it is preferred to use a palladium chloride/hydrochloric acid solution (giving rise to (PdCl$_4$)$^-$ ions) or a hexachloropalladate solution, suitably of the potassium salt.

In both cases reduction to palladium metal is necessary and can be effected with, for example, hydrogen (if suitable, "in situ" in the actual hydrogenation process for which it is to act as catalyst). Alternatively a separate reducing agent can be employed, such as an aqueous solution of formic acid or sodium formate or formaldehyde, at a suitable temperature, from e.g. 70° C. to boiling point, can be employed. It is possible to use an aqueous hydrazine solution for the reduction but it is found that it has a somewhat deleterious effect on the activity of the final catalyst.

In the case of plantinum and rhodium, deposition of a cation exchange resin can be effected through the intermediary of cationic amine complexes, e.g. tetramine platinum (II) chloride and chloropentamine rhodium (III) dichloride. Reduction to the metal is suitably effected by thermal decomposition, e.g. at about 300° C., preferably in a nitrogen atmosphere. For deposition of platinum and rhodium on an anion exchange resin a convenient method is by way of hexachloroplatinic acid or sodium hexachlororhodate respectively each in aqueous solution. Reduction to the metal is suitably effected by the use of aqueous solutions of, for example, formic acid or sodium formate or formaldehyde or in the case of rhodium, "in situ" in a hydrogenation reaction as described above for palladium. Again, an aqueous hydrazine solution may be employed but with some loss of catalyst activity.

If a mixture of metals is required on the exchange resin then this can be obtained by using a mixed solution of appropriate salts of the relevant metals employing the same general procedure as above described.

For production of the catalysts it is preferred that initially the cation exchange resins should be in the alkali metal form, the strongly anionic exchange resins should be in the Cl⁻ form, and the weakly anionic exchange resins should be in either the free-base form or the Cl⁻ form. Advantageously the catalyst should contain at least 0.0025 g. atoms of metal per 100 g. of catalyst for instance from 0.0048 to 0.096 preferably 0.048 to 0.058 gram atoms of metal per 100 grams of catalyst where rhodium, ruthenium or palladium are used and about 0.0026 to 0.052 preferably 0.026 to 0.031 gram atoms of metal per 100 grams of catalyst where osmium, iridium or platinum are used. Suitable macroreticular ion-exchange resins for use in preparing hydrogenation catalysts in accordance with the invention are styrene-divinyl benzene copolymer types such as those sold under the trade names (1) Amberlyst XN–1005— a strong cation exchange resin in the H⁺ form having a surface area of 122 m.²/g.; (2) Amberlyst A–27, and A–29 which are strong anion exchange resins in the C⁻ form, and A–21 a weak anion resin in the free base form. These three materials have surface areas of 50 to 70 m.²/g., 40 to 50 m.²/g. and 20 to 30 m.²/g. respectively. Suitable particle sizes are 40 to 350 (preferably 50 to 200) B.S.S. mesh and may, if necessary, be produced by grinding, or by otherwise reducing, particles of larger sizes. If desired the exchange resin can be in the form of a process organic resinous material (having the required surface area of at least 5 m.²/g.) which has been treated to absorb, for example, a compound having an —SO₃⁻H⁺ group, or a quaternary ammonium compound.

It is found that when employing a strongly cationic exchange resin the selectivity of the resultant catalyst can be appreciably improved by a treatment with alkali after removal from the solution containing the ions of the metals and reduction. A typical treatment consists in heating (to 200° C. in a closed vessel) the catalyst with 50% NaOH solution (preferably 1:10 w./v.). When we refer hereafter to cation exchange resins being treated "as herein described" we mean that the resin has been so treated.

A wide variety of ionic forms of the resins used in our invention may be employed subject, in particular instances some of which are discussed hereinafter, the disadvantages which may accrue from reaction between ions liberated during hydrogenation according to the invention and the apparatus or solvent used. Suitable cationic resins may advantageously be in the H⁺ form or particularly, in the Na⁺ or K⁺ forms. Suitable anionic resins may be in the Cl⁻ or OH⁻ form or, particularly, in the SO₄²⁻ or CO₃²⁻ forms. The particular functional grouping desired may be achieved by treating ion exchange resins which are initially in a different from by known means so as substantially to replace the existing grouping by the desired grouping. Such replacement may be carried out either before, or after, deposition of the catalyst metal on the resin. Among properties possessed by a useful catalyst material are (a) good activity with respect to the desired reaction (b) good selectivity toward the desired reaction, and (c) good resistance to attrition and poisoning during use.

These properties are especially important for catalysts for use in cyclic processes for the production of hydrogen peroxide. As is well-known, in many cyclic processes the hydrogenation step involves suspending the catalyst in a solution of the compound (commonly an alkyl-substituted anthraquinone) to be hydrogenated and filtering the catalyst from the solution after hydrogenation.

We have found that catalysts in accordance with this invention have in comparison with the more important known catalysts comprising a platinum group metal on a support, a good combination of activity and selectivity. Certain of the catalysts also show a surprising resistance to attrition. Moreover, in the case of rhodium and, more especially platinum, a high and unexpectedly superior selectivity is observed toward the desired hydrogenation reaction. The Pt/anion-exchange resin catalyst, particularly when employing the strongly anionic form, is an especially advantageous form in this respect. It has been observed that over a period of weeks the retention of activity of a Pt/anion exchange resin catalyst in accordance with the invention is appreciably superior to known Pd/alumina and Pd/synthetic aluminosilicate catalyst. It does appear that the advantageous properties of the preferred catalysts in accordance with the invention do not stem solely from the use of an ion exchange resin or of a particular metal but from the combination of both these factors.

It is well-known that in cyclic processes for the production of $H_2O_2$ it is common, during continued recycling for an amount of nuclearly hydrogenated compound to be formed during hydrogenation. This is slower to oxidise than the parent compound. Also an amount of so called degradation products or inerts are formed, which have very little, or no $H_2O_2$ producing capacity per se.

We have found (particularly when employing 2-ethyl-anthraquinone in such cyclic processes) that with a rhodium or more especially a palladium or platinum, hydrogenation catalyst of the invention, such nuclear hydrogenation and accordingly the formation of inerts is very substantially reduced. This is illustrated in Example 1 hereafter. This invention also provides processes for hydrogenation employing the novel catalysts and particularly such processes when part of a cyclic process for producing hydrogen peroxide. In such cyclic processes for producing $H_2O_2$, the solvent or solvent mixture used in the process may influence the selection of the ion-exchange resin employed for preparing the catalyst. Thus, for example, where the solvent is, or contains, an ester, such as a cyclohexanol ester, then it may not be preferred to employ a cation exchange resin in the form which may bring about some hydrolysis of the ester. For the same reason with such an ester it may not be preferred to use an anion resin in the OH⁻ form. Where an anion exchange resin in the Cl⁻ form is used there may be a liberation of Cl⁻ ions if any ion exchange takes place during use of the catalyst. This may be disadvantageous if apparatus which is prone to attack by Cl⁻ ions is used. Where such apparatus is used it may be desired, when using exchange resins originally in the Cl⁻ form to subject such resins, before use, to an ion-exchange reaction to replace Cl⁻ ions by other suitable ions.

The invention is further illustrated by the following examples:

EXAMPLE 1

This example compares the selectivity of catalysts having supports according to the invention and catalysts using previously used supports for example alumina and artificial aluminosilicate with respect to the hydrogenation of 2-ethylanthraquinone (EAQ) or, where indicated, tetrahydro-2-ethylanthraquinone ($H_4EAQ$).

In each case 0.5 g. of the quinone was employed and hydrogenated over 1 g. of catalyst at 50° C. and in a 50/50 v./v. solvent-mixture of hydrocarbons (those sold under the name "Aromasol") and methyl cyclohexanol esters (those sold under the name "Sextate").

For each quinone the corresponding hydroquinone is formed when 22.4 litres of hydrogen (at N.T.P.) have been taken up per mole of quinone. In the tests conducted, the hydrogenation was pursued substantially beyond the time taken for uptake of 22.4 litres. Further uptake beyond this volume corresponds to formation of nuclearly hydrogenated products and, eventually degradation products. Consequently the smaller this further uptake the better, i.e. more selective, is the catalyst toward the desired reaction vis: the formation of hydroquinone only. In the following table the degree of hydrogenation is expressed as a "hydrogenation factor" a factor of 1.0 being equivalent to uptake of 22.4 litres of $H_2$ at N.T.P. Therefore the nearer 1.0 the hydrogenation factor is the more selective the catalyst. In cases where the hydrogenation factor is quoted as 0 no hydrogen uptake at all was observed.

| Metal | G./atom/ 100 g. cat. | Support | Quinone | Hydrogenation factor after— | | | |
|---|---|---|---|---|---|---|---|
| | | | | 1 hr. | 2 hrs. | 5 hrs. | 17 hrs. |
| Pd | 0.0122 | Alumina | EAQ | 1.54 | 1.97 | 2.70 | 3.73 |
| Pd | 0.0188 | do | EAQ | 1.68 | 2.10 | 2.90 | 3.70 |
| Pd | 0.0188 | Synthetic aluminosilicate | EAQ | 1.63 | 2.08 | 2.70 | 3.57 |
| Pd | 0.0188 | do | H$_4$EAQ | 1.41 | 1.45 | 1.59 | 2.05 |
| Pd | 0.317 | Amberlyst XN 1005 (alkali treated as described). | EAQ | 0.80 | 1.09 | 1.34 | 1.83 |
| Rh | | Alumina | EAQ | 0 | 0 | 0 | 0 |
| Rh | 0.856 | Amberlyst A27 (Cl⁻ form) | EAQ | 1.47 | 1.88 | 2.75 | 3.42 |
| Pt | | Alumina | EAQ | 0 | 0 | 0 | 0 |
| Pt | | Synthetic aluminosilicate | EAQ | 0 | 0 | 0 | 0 |
| Pt | 0.0430 | Amberlyst A27 (Cl⁻ form) | EAQ | 1.07 | 1.18 | 1.18 | |
| Pt | 0.0259 | Amberlyst A27 (Cl⁻ form) | EAQ | 0.85 | 0.94 | 1.14 | 1.63 |
| Pt | 0.0290 | Amberlyst A27 (Cl⁻ form) | EAQ | 1.05 | 1.18 | 1.41 | 1.92 |
| Pt | 0.0231 | Amberlyst A27 (SO$_4^{2-}$ form) | EAQ | 1.25 | 1.42 | 1.78 | 2.61 |
| Pt | 0.0210 | Amberlyst A27 (OH⁻ form) | EAQ | 1.01 | 1.05 | 1.12 | 1.32 |
| Pt | 0.0290 | Amberlyst A27 (CO$_3^{2-}$ form) | EAQ | 1.08 | 1.15 | 1.29 | 1.66 |
| Pt | 0.0290 | Amberlyst A21 (Cl⁻ form) | H$_4$EAQ | 1.12 | 1.16 | 1.27 | 1.40 |

In a selectivity test such as the above the amount of metal on the catalyst is not of prime importance. The results should be interpreted in a comparative manner. Thus it is clear that while the rhodium catalyst according to the invention caused appreciable over-hydrogenation it, nevertheless constituted a remarkable improvement over the alumina based rhodium catalyst which had no apparent activity. The palladium based catalyst according to the invention also gives a considerable improvement even over the synthetic aluminosilicate based catalyst when the later is used in H$_4$EAQ hydrogenation where the tendency to over-hydrogenate would be expected to be less than would be shown by EAQ itself. It is evident from the table however that Pt/anion resin catalysts according to the invention are outstandingly effective.

EXAMPLE 2

This example compares the activity of various catalysts using supports according to the invention with those using supports previously known, such as alumina and a synthetic aluminosilicate. The tests involve reducing 8 g. of 2-EAQ in 100 ml. of 50/50 v./v. Aromasol/Sextate at room temperature using 0.15 g. of catalyst.

exchange catalyst gives a remarkable improvement over the alumina based rhodium catalyst.

EXAMPLE 3

This example compares the resistance to attrition shown by catalysts or supports according to our invention in comparison with a synthetic alumino-silicate catalyst. The resins were in the form of spheroidal beads while the alumino silicate had a granular form.

A quantity of the catalyst or catalyst support was suspended in a 50/50 v./v. mixture of aromasol and sextate in a glass cylinder having a bore of 3.8 cms. and a ground inner surface. A stainless steel rotor having a diameter of 2.5 cms. was immersed in the suspension and rotated at a constant high speed. After the period stated in the table below the rotor was stopped and the total solids and solvent in the glass cylinder was transferred to a setting vessel and made up to a fixed volume with further solvent. After allowing the solids to settle for 5 minutes a fixed volume of the supernatant liquid was withdrawn by pipette and its solids content was measured by passing it through a sintered glass filter of fine porosity. The catalysts and supports used in the experiment have a fines con-

| Metal | G/atoms/ 100 g. cat. | Support | Size B.S. Sieves | Minutes to absorb 50 ml. H$_2$ at N.T.P. |
|---|---|---|---|---|
| Pd | 0.0122 | Alumina | −60+80 | 35.0 |
| Pd | 0.0188 | do | −100+200 | 12.5 |
| Pd | 0.0192 | do | −100+150 | 23.5 |
| Pd | 0.0188 | Synthetic aluminosilicate | −100+200 | 16.3 |
| Pd | 0.0188 | do | −100+150 | 18.3 |
| Pd | 0.0188 | do | −100+240 | 15.5 |
| Pd | 0.0222 | Amberlyst XN 1005 (H⁺ form) | −85+100 | 23.8 |
| Pd | 0.0639 | Amberlyst N1005 (alkali treated as described) | −85+100 | 48.0 |
| Pd | 0.0550 | Amberlyst A27 (Cl⁻ form) | −100+150 | 24.5 |
| Pd | 0.0567 | Amberlite IRC 50 (H⁺ form) | −44+60 | ∞ |
| Rh | 0.0097 | Alumina | −100+200 | ∞ |
| Rh | 0.0856 | Amberlyst A27 (Cl⁻ form) | −44+69 | 27.5 |
| Pt | 0.0103 | Alumina | −100+200 | ∞ |
| Pt | 0.0038 | Synthetic aluminosilicate | −100+200 | ∞ |
| Pt | 0.0188 | Amberlyst A27 (Cl⁻ form) | −100+150 | 13.0 |
| Pt | 0.0241 | Amberlyst A27 (Cl⁻ form) | −100+150 | 7.5 |
| Pt | 0.0218 | Amberlyst A27 (Cl⁻ form) | −100+200 | 7.5 |
| Pt | 0.0231 | Amberlyst A27 (SO$_4^{2-}$ form) | −100+150 | 13.0 |
| Pt | 0.0210 | Amberlyst A27 (OH⁻ form) | −100+200 | 13.0 |
| Pt | 0.0290 | Amberlyst A27 (CO$_3^{2-}$ form) | −100+200 | 13.0 |
| Pt | 0.0266 | Amberlyst A29 (Cl⁻ form) | −100+150 | 20.5 |
| Pt | 0.0184 | Amberlite C G400 (Cl⁻ form) | −100+150 | ∞ |
| Pt/Rh | 0.0164 Pt plus 0.0107 Rh | Amberlyst A27 (Cl⁻ form) | −100+200 | 13.0 |

The runs with Amberlite CG–400 and Amberlite IRC–50 are given by way of comparison. Amberlite CG–400 is a non-macroreticular ion-exchange resin with a surface area of less than 0.1 m.²/g. while Amberlite IRC–50 is macroreticular but with a surface area of only 2 m.²/g.

The particle size of the catalyst influences its activity the smaller the size the better the activity. This must be taken into account when comparing the results in the above table. Increase in weight of metal enhances activity to some extent.

Again it will be seen that the Pt/anion resin catalysts give particularly good results and that the rhodium/anion tent of substantially 0 measured by the same method but without using the rotor.

| Support | Support size, B.S. Sieves | Metal Content, percent w./w. | Period of Attrition, hrs. | Fines produced mgms./ 5 gms. support |
|---|---|---|---|---|
| Synthetic alumino-silicate | −100+200 | 2.1 | 3 | 46 |
| Amberlyst A27 | −22+44 | 0 | 3 | 63 |
| Amberlyst A21 | −22+44 | 0 | 3 | 3.2 |
| Do | −22+44 | 8.6 | 3 | 5.5 |
| Amberlyst XN–1005 | −22+44 | 0 | 18 | 2.7 |
| Do | −22+44 | 4.38 | 3 | 7.6 |

This experiment shows that Amberlyst A–21 and Amberlyst XN–1005 show excellent resistance to attrition which is an important property of catalysts when in use in the production of hydrogen peroxide. While Amberlyst A–27 had a resistance to attrition of the same order as the synthetic alumino silicate used it can be seen that this resin when carrying a catalyst metal constitutes a particularly selective and active catalyst.

EXAMPLE 4

For the preparation of a palladium-anion resin catalyst an aqueous slurry was made of Amberlyst A–27 resin in the chloride form and of size range —100 +150 mesh B.S.S. and sufficient palladium chloride to give 5% metal in the final product. The slurry was slightly acidified with hydrochloric acid to prevent hydrolysis.

The slurry was stirred for 20 minutes and the resin was then filtered free from supernatant liquor and washed with demineralised water. The resin was then treated to reduce the palladium to the metallic state. For this, the water-wet resin was added to a boiling solution of sodium formate (20 g./l.) in demineralised water. Boiling was continued for 30 minutes during which time further additions of solid sodium formate were made until vigorous effervescence on addition of sodium formate ceased. The mixture was cooled, filtered and the palladised resin washed with demineralised water and dried.

EXAMPLE 5

The preparation described in Example 4 was repeated up to the palladium reduction step. In the present example that step was conducted by drying the moist resin by displacing imbibed water with acetone and then removing the acetone in the oven at 70° C. The dry resin was then placed under benzene (or other inert solvent) and shaken with hydrogen in the usual way. When hydrogen uptake ceased the reduction was complete and the catalyst was dried.

EXAMPLE 6

The preparation described in Example 4 was repeated up to the palladium reduction step. In the present example the reduction step was conducted by adding the water-moist resin to a solution of excess formaldehyde in demineralised water at 70° C. When reaction was complete the solution was cooled, filtered and the palladised resin dried.

EXAMPLE 7

For the preparation of a rhodium-anion resin catalyst, the procedure of Example 4 was adopted, employing an aqueous solution of sodium hexachlororhodate.

EXAMPLE 8

For the preparation of a platinum-anion resin catalyst the procedure of Example 4 was adopted, employing an aqueous solution of hexachlorplatinic acid.

EXAMPLE 9

In the case of a platinum-cation resin catalyst use was made of Amberlyst XN–1005 in the Na+ form and of size range —60 +85 mesh B.S.S. The procedure was as in Example 4 as far as the reduction step, except that an aqueous solution of tetramine platinum (II) chloride was employed. In this case reduction was effected by heating the product to 300–310° C. in an atmosphere of nitrogen.

What is claimed is:
1. A catalyst material, suitable for use in hydrogenation reactions, essentially comprising a macroreticular ion exchange resin having a surface area of at least 5 m.$^2$/g. carrying a deposit of a metal selected from the group consisting of ruthenium, rhodium, palladium, osmium, iridium and platinum or a combination of any of these metals.
2. A catalyst material as claimed in claim 1 wherein the ion exchange resin has a surface area of from 20 m.$^2$/g. to 80 m.$^2$/g.
3. A catalyst material as claimed in claim 1 wherein the ion exchange resin contains no particles larger than 40 mesh B.S.S.
4. A catalyst material as claimed in claim 1 wherein the ion exchange resin has no particles smaller than 350 mesh B.S.S.
5. A catalyst material as claimed in claim 1 wherein the ion exchange resin comprises particles of from 200 mesh B.S.S. to 50 mesh B.S.S.
6. A catalyst material, suitable for use in hydrogenation reactions, essentially comprising a macroreticular anionic or cationic exchange resin having a surface area of at least 5 m.$^2$/g. carrying a deposit of ruthenium, rhodium, palladium, osmium, iridium or platinum or any combination thereof.
7. A catalyst material as claimed in claim 6 wherein the resin is in the H+, Na or K form.
8. A catalyst material as claimed in claim 6 wherein the resin is the Cl—, OH—, SO$_4^{2-}$ or CO$_3^{2-}$ form.
9. A catalyst material as claimed in claim 6 wherein the ion-exchange resin carries a deposit of at least 0.0025 gm. atoms of metal per 100 g. of catalyst.
10. A catalyst material as claimed in claim 6 wherein the ion-exchange resin carries a total deposit of from 0.0048 to 0.096 gram atom of one or more of rhodium, ruthenium or palladium per 100 grams of catalyst.
11. A catalyst material as claimed in claim 6 wherein the ion-exchange resin carried a total deposit of from 0.0026 to 0.052 gram atom of one or more of osmium, iridium or platinum.
12. A catalyst material, suitable for use in hydrogenation reactions, essentially comprising a macroreticular anionic exchange resin in the Cl—, OH—, SO$_4^{2-}$ or CO$_3^{2-}$ form, having a surface area of from 20 m.$^2$/g. to 80 m.$^2$/g. and consisting of particles of from 200 mesh B.S.S. to 50 mesh B.S.S. carrying a deposit of from 0.0026 to 0.052 gram/atom of platinum per 100 g. catalyst material.
13. A process for the production of a catalyst essentially comprising a macroreticular ion-exchange resin having a surface area of at least 5 m.$^2$/g. carrying a deposit of one or more of the metals ruthenium, rhodium, palladium, osmium, iridium and platinum comprising contacting the ion exchange resin with a solution containing ions of the metal or metals to be deposited thereon removing the ion exchange resin containing absorbed metal ions from the bulk of the solution and reducing the absorbed ions to the corresponding metal.
14. A process as claimed in claim 13 wherein the resin is a cation exchange resin, the metal to be deposited thereon is palladium and the resin is contacted with palladium nitrate/nitric acid solution.
15. A process as claimed in claim 13 wherein the resin is a cation exchange resin, the metal to be deposited thereon is palladium and the resin is contacted with palladium sulphate/ sulphuric acid solution.
16. A process as claimed in claim 13 wherein the resin is an anion exchange resin, the metal to be deposited thereon is palladium and the resin is contacted with palladium chloride/hydrochloric acid solution.
17. A process as claimed in claim 13 wherein the resin is an anion exchange resin, the metal to be deposited thereon is platinum and the resin is contacted with an aqueous solution of hexchloroplatinic acid.
18. A process as claimed in claim 13 wherein the resin is an anion exchange resin the metal to be deposited thereon is rhodium and the resin is contacted with an aqueous solution of sodium hexachlororhodate.
19. A process for the production of a catalyst essentially comprising a macroreticular ion-exchange resin having a surface area of at least 5 m.$^2$/g. carrying a deposit of one or more of the metals ruthenium, rhodium, palladium, osmium, iridium and platinum which com- prises contacting the ion-exchange resin with a solution containing ions of the metal or metals to be deposited thereon, removing the ion-exchange resin containing absorbed metal ions from the bulk of the solution and reducing the absorbed ions to the metal by means of an aqueous solution of formaldehyde, formic acid or sodium formate.

20. A process for the production of a catalyst essentially comprising a macroreticular ion-exchange resin having a surface area of at least 5 m.$^2$/g. carrying a deposit of one or more of the metals ruthenium, rhodium, palladium, osmium, iridium and platinum which comprises contacting the ion-exchange resin with a solution containing ions of the metal or metals to be deposited thereon, removing the ion-exchange resin containing absorbed metal ions from the bulk of the solution and the absorbed ions are reduced to the metal in the hydrogenation reaction to be catalysed.

21. A process for the production of a catalyst essentially comprising a macroreticular cation exchange resin having a surface area of at least 5 m.$^2$/g. carrying a deposit of rhodium or platinum which comprises contacting the resin with an aqueous solution of chloropentamine rhodium dichloride or tetra-amine platinum chloride respectively, removing the resin from the bulk of the solution and reducing the absorbed complex to metal.

22. A process as claimed in claim 21 wherein the complex is reduced by heating the resin in a nitrogen atmosphere to a temperature above that at which the complex decomposes to the metal.

23. A process for the production of a catalyst essentially comprising a macroreticular ion-exchange resin having a surface area of at least 5 m.$^2$/g. carrying a deposit of one or more of the metals ruthenium, rhodium, palladium, osmium, iridium and platinum comprising contacting the ion exchange resin with a solution containing ions of the metal or metals to be deposited thereon, removing the ion exchange resin containing absorbed metal ions from the bulk of the solution and reducing the absorbed ions to the corresponding metal whereafter the catalyst is treated with an alkali.

24. A process for the production of hydrogen peroxide which comprises hydrogenation of a quinone in the presence of a catalyst as claimed in claim 1 wherein the hydrogenation is a part of a cyclic process for the production of hydrogen peroxide involving alternate hydrogenation and oxidation of the quinone.

25. A process as claimed in claim 24 wherein the quinone is an alkyl substituted anthraquinone.

26. A process as claimed in claim 25 wherein the suitable quinone compound is 2-ethyl anthraquinone.

27. A process as claimed in claim 25 wherein a catalyst of rhodium or platinum supported on an anionic exchange resin is used.

28. A process according to claim 24 wherein the reaction solvent contains a cyclohexanol ester.

References Cited

UNITED STATES PATENTS

| | | | |
|---|---|---|---|
| 3,150,930 | 9/1964 | Hiratsuka | 23—207 |
| 3,361,533 | 1/1968 | Hooper | 23—207 |
| 3,288,725 | 11/1966 | Aftandiliano | 252—447 |
| 2,852,474 | 9/1958 | Arundale | 252—466 |
| 2,857,337 | 10/1958 | Hamilton | 252—472 |
| 2,861,045 | 11/1958 | Langer | 252—430 |

DANIEL E. WYMAN, Primary Examiner

PHILIP M. FRENCH, Assistant Examiner

U.S. Cl. X.R.

252—430